INVENTOR
WILLI BRANDL
BY Dicke + Craig
ATTORNEYS

United States Patent Office 3,274,360
Patented Sept. 20, 1966

3,274,360
TEMPERATURE-RESPONSIVE CONTROL MECHANISM FOR HEATING APPARATUS
Willi Brandl, Schurbungert 12, Zurich, Switzerland
Filed May 26, 1964, Ser. No. 370,257
Claims priority, application Germany, May 28, 1963,
B 72,081
4 Claims. (Cl. 200—122)

The present invention relates to a mechanism for controlling the operation of a heating apparatus of a type which essentially consists of an evacuated chamber which is partly filled with a liquid, for example, water, and of one or more heating elements for heating the liquid in this chamber which are controlled and adapted to be switched off by this mechanism when the liquid reaches a certain temperature.

A control mechanism which is known for this purpose comprises a diaphragm which is acted upon by the internal pressure which is produced within the evacuated chamber and which, in turn, operates a control switch or similar regulating device. Such a heating apparatus has the advantage that, independently of the medium to be heated therein it will never exceed what is hereafter called its "surface temperature," i.e. the preset temperature of the surface of the chamber enclosing the vacuum and the steam and water, and that it also prevents any further temperature increase if the apparatus does not contain any medium to be heated and when there is thus no cooling effect by such a medium upon the evacuated chamber. Such a control mechanism insures that the surface temperature will be accurately controlled at all times and that the apparatus will operate safely even through it contains no liquid or other medium to be heated and when the heating element is highly loaded.

In some of these apparatus, the heating element is connected to a control circuit so as to adapt itself exactly to the transmission of heat to the medium to be heated without increasing the surface temperature. Although sometimes this may not be desirable, there are many instances in which it is of advantage, for example, when a medium is to be heated which has a low heat-absorbing property and will not tolerate any overheating without being damaged.

If an evacuated heating chamber emits too much heat or its surface load is too large, the temperature gradient between the surface of the chamber walls and the partly heated medium no longer suffices in order to transmit the entire heat output. Consequently, the heating element will then be switched on and off repeatedly until the medium is finally heated up to the desired temperature. Such a manner of operation increases the length of time which is required for heating the medium to the desired temperature and the frequent switch operations result in an excessive wear upon the switch elements and contacts.

It is a principal object of the present invention to provide a control mechanism which avoids such frequent switch operations and considerably increases the efficiency of the heating apparatus.

Since the length of time required for heating the medium to the desired temperature and the frequency of the switch operations depend upon the fact that the resistive load on the heating element is in proportion to the size of the heat-transmitting surface of the evacuated chamber and since within different temperature ranges the switching operations occur at different intervals in accordance with the steam generation, it is advisable especially for heating elements with a high resistance to avoid a control mechanism which is only partly influenced by the heating steam in the evacuated chamber, while it is also partly influenced by the medium to be heated.

The present invention therefore relates to a mechanism for controlling the operation of the heating apparatus of the above-mentioned type and it is an object of the invention to improve such a control mechanism so as to be dependent not merely upon the temperature in the evacuated chamber, but also upon the temperature of the medium to be heated so that the period until the heating element is switched off is delayed when the evacuated chamber containing the steam has already been heated to the final temperature but the medium to be heated has not as yet reached the desired temperature because of the relatively small surface area of the chamber walls.

Such a control mechanism is attained according to the invention by the provision of a heat-sensitive element having an outer surface, one part of which is surrounded and influenced by the temperature of the medium to be heated and another part by the temperature of the steam chamber, and which is adapted to switch off the heating element. The sizes of these two surface parts of the heat-sensitive element are fixed or adjustable relative to each other to a certain value at which, after the steam chamber has already been heated to the final temperature, the heating element will be switched off by the action of the heat-sensitive element, but not until the medium to be heated has approximately or accurately reached its desired final temperature.

According to one embodiment of the invention the upper part of the heat-sensitive element which is acted upon by the medium to be heated is soldered at its lower end to the center of the upper wall of the steam chamber, while the lower part of this element which has a considerably smaller diameter forms a thin tube which extends centrally through the steam chamber from its upper to its lower end where it communicates with a bellows-shaped diaphragm which acts upon a control switch. In addition to this control switch, the apparatus may also be provided with a safety switch which is actuated if the control switch fails to operate and the pressure in the steam chamber exceeds a certain value.

According to another embodiment of the invention, the heat-sensitive element may have a substantially uniform diameter along its length and while its upper part projects from the steam chamber into the container holding the medium to be heated, its lower part extends downwardly for a certain distance centrally into the steam chamber and its lower end is connected to a thin tube which extends through the lower part of the steam chamber and communicates with a bellows-shaped diaphragm which acts upon a control switch.

According to a modification of this last embodiment of the invention the steam chamber may be provided with a vertical tube which extends centrally therethrough and is secured to its upper and lower walls, and the heat-sensitive element may be mounted within this tube so as to be adjustable longitudinally to different positions or elevations relative to the steam chamber.

A further modification of the invention consists in providing the steam chamber with a tubular member which is closed at its lower end, is secured to the upper wall of the steam chamber, and extends centrally into this chamber to a point above its bottom, in mounting the heat-sensitive element in this tubular member so as to be adjustable longitudinally therein to different positions or elevations, to connect its upper end which projects from the steam chamber to a bellows-shaped diaphragm which may act upon a control switch, and to provide the bottom of the steam chamber in the form of a diaphragm which may act upon an additional safety switch for switching off the heating element independently of the control switch in the event that the pressure in the steam chamber becomes excessive.

The features and advantages of the present invention will become more clearly apparent from the following detailed description thereof which is to be read with reference to the accompanying drawings, in which:

FIGURE 2 shows a vertical section of a modification of a part of the control mechanism according to FIGURE 1;

FIGURE 3 shows a vertical section of another modification of the same part of the control mechanism according to FIGURES 1 and 2; while

Figure 1:
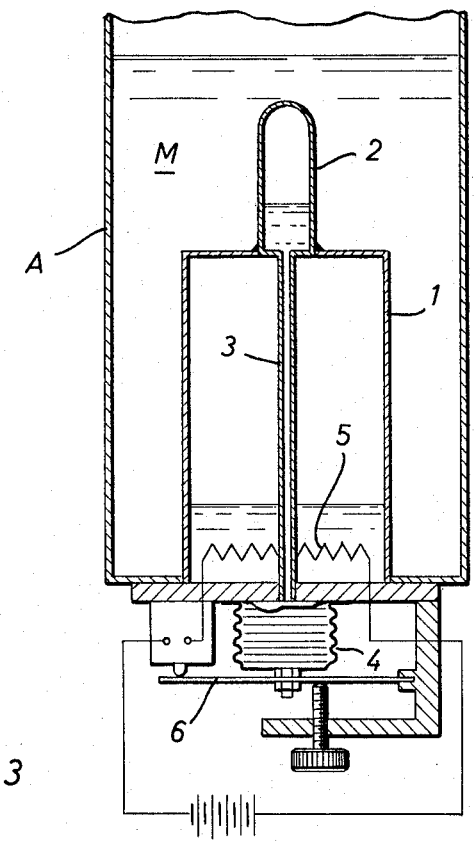
FIGURE 1 shows a vertical section of a heating apparatus with a control mechanism according to one embodiment of the invention.

The heating apparatus for which the control mechanism according to the invention is to be used may consist of an outer container A of any suitable dimensions in which a medium M, is to be heated to a predetermined temperature. According to FIGURE 1, the container A is for this purpose provided with an inner container wall 1 which encloses an evacuated chamber D and extends upwardly from the bottom of the container A and coaxially with the latter and is partly filled with a liquid, for example, water, for producing steam in this chamber for heating the surrounding medium M. An essential feature of the invention consists in the provision of a heat-sensitive element or "temperature feeler" which, according to the first embodiment of the invention as shown in FIGURE 1, consists of an upper tubular member 2 of a particular predetermined length which is closed at its upper end and soldered at its lower end to the upper wall of the inner container 1, and of a thin metal tube 3 which communicates with the lower end of the wider tubular member 2 and extends centrally through the steam chamber D and through the bottom thereof. The upper tubular member 2 is directly surrounded by the medium M and acted upon by the temperature of this medium, while the lower, considerably thinner tube 3 is acted upon by the temperature in the steam chamber D and terminates into a bellows-shaped diaphragm 4 which is secured to the bottom of the container 1. Steam chamber D further contains a heating element 5 which may be of any suitable type and is in this case indicated in the form of an electric heating element which is connected at one end to one terminal of an adjustable control switch 6 which is acted upon by the closed lower end of the bellows 4. The other end of the heating element 5 and the other terminal of switch 6 are adapted to be connected to a source of current.

When the heating element 5 is first switched on, it generates steam in the steam chamber D and thereby heats the surfaces of the container 1 and through the latter the medium M in the outer container A. The temperature feeler 2, 3 which is likewise partly filled with a liquid which, however, does not have to be of the same kind as the liquid in chamber D, is likewise heated by the steam in chamber D, but the upper part 2 thereof is at the same time cooled by the medium M which is to be heated. Since this upper part 2 of the temperature feeler which is directly surrounded by the medium M has a larger surface area than the part which engages with the steam chamber D, it will also be subjected to a greater thermal influence than the latter part. When the resulting pressure in the temperature feeler 2, 3 increases to a certain limit, it acts upon the bellows 4 and through the latter upon the control switch 6 to switch off the heating element 5.

Figures 2, 3:
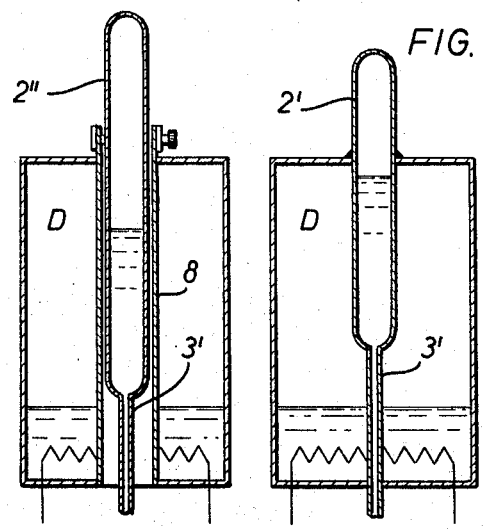

The modification of the control mechanism as illustrated in FIGURE 2 differs from that as shown in FIGURE 1 merely by the fact that the wider upper part 2' of the temperature feeler is also partly inserted into the steam chamber 1. Therefore, a predetermined part of the length of the temperature feeler projects above the upper wall of the steam chamber 1 to which it is also secured while the lower part thereof extends into the steam chamber 1 and is connected by a tube 3' to the bellows 4, as shown in FIGURE 1. The proportionate influence which is exerted upon the temperature feeler 2' by the medium M and the steam chamber D depends upon the depth to which the temperature feeler is inserted into the steam chamber.

The further modification of the control mechanism as illustrated in FIGURE 3 differs from the embodiment according to FIGURE 2 in that a separate tube 8 is inserted into the steam chamber D and soldered to the upper and lower walls thereof. The temperature feeler 2'' is inserted into this tube 8 and is adjustable therein longitudinally to different positions or elevations in which it may then be locked.

Figure 4:
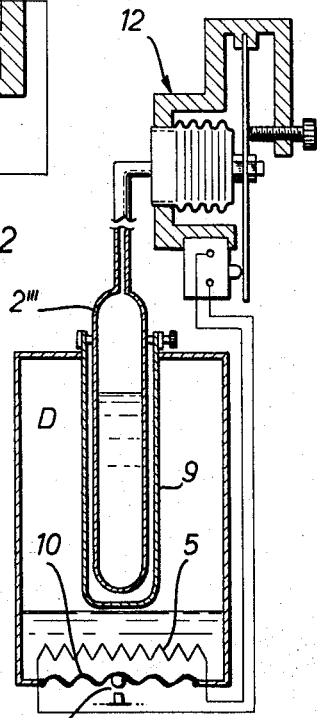
FIGURE 4 shows a vertical section through still another modification of the control mechanism according to the invention.

FIGURE 4 shows another embodiment of the invention, in which in place of the continuous tube 8 as shown in FIGURE 3 a tube 9 which is closed at its lower end extends into the steam chamber D and is secured near its upper end to the upper wall of the steam chamber. The temperature feeler 2''' is inserted into the tube 9 in a position reverse to that as shown in FIGURE 3, but it is adjustable therein in its longitudinal direction relative to the steam chamber D in the same manner as shown in FIGURE 3. The thin extension tube on the outer end of the temperature feeler 2''' may be connected to a separate control mechanism 13. This apparatus is in addition provided with a safety switch 11 which may be actuated by the diaphragm-shaped bottom 10 of chamber D if the control switch should fail to operate and an excessive pressure is produced in chamber D. A similar safety switch may, of course, also be provided in the apparatus according to FIGURES 1 to 3.

In the event that the heating apparatus is switched on without containing any medium M which is to be heated and which would exert a cooling action upon the upper part 2, 2', 2'', or 2''' of the temperature feeler, the water or other liquid contained therein will be heated up so quickly that the control switch 6 or 12 will also switch off the heating element 5 very quickly so that no damage to the apparatus can occur.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A control mechanism for a heating apparatus comprising a container holding a medium to be heated, an evacuated chamber disposed within said container surrounded by said medium and partly filled with a liquid, a heating element in said chamber effective, when energized, to generate steam from said liquid and thereby to heat the walls of said chamber, said heated walls being effective to heat said medium, energizing means for said heating element, disconnectable means forming an operative connection between said energizing means and said heating element, actuating means for said disconnectable means effective to interrupt said connection and halt the energization of said heating element only upon the successive attainment of predetermined temperatures in said chamber and of said medium, control means for said actuating means comprising a heat sensitive element having a lower part disposed within said chamber and an upper part within said medium, said parts being interconnected and including means producing pressure on said actuating means varying in accordance with the temperatures of said parts, said parts being influenced by the temperatures of said chamber and said medium, respectively, one of said parts being operatively connected with said actuating means, said two parts comprising means facilitating said successive attainment of said predetermined temperatures, first in said chamber and subsequently of said medium, said last-named means including differences in the relative surface areas of said two parts.

2. A control mechanism as defined in claim 1, in which said upper part is tubular and of a substantially uniform diameter, a portion of said upper part extending into said chamber centrally of the latter, said lower part comprising a thin tube connected to the lower end of said upper part, said actuating means comprising a bellows forming a diaphragm, said disconnectable means comprising a control switch operatively connected to said bellows, said thin tube connected at its lower end to and communicating with the inside of said bellows to transmit said pressure from said heat-sensitive element to said bellows to expand the same and thereby to cause said control switch to switch off said heating element, a further tube extending entirely through said chamber coaxially therewith and secured to the upper and lower walls of said chamber, said heat-sensitive element being partly disposed within said further tube and partly projecting from said further tube and said chamber into said container, and means for adjusting said heat-sensitive element longitudinally within said further tube and for locking said heat-sensitive element at different elevations relative to said steam chamber.

3. A control mechanism as defined in claim 1, further comprising a tube having a closed lower end and extending into said chamber coaxially thereto and secured to the upper wall of said chamber, said heat-sensitive element being tubular, said lower part extending into said tube, said upper part comprising a portion projecting from said tube and said chamber into said container, means for adjusting said heat-sensitive element longitudinally within said tube and for locking said heat-sensitive element at different elevations relative to said chamber, said actuating means comprising a bellows forming a diaphragm, said disconnectable means comprising a control switch, said energizing means comprising a current source, said control switch being operably connected with said heating element and said current source and movable to an off position in which said heating element is disconnected from said current source, means connecting said bellows and said control switch enabling movement of said control switch by said bellows to said off position and means connecting the end of said upper part of said heat-sensitive element to said bellows so as to communicate with the interior of said bellows and to transmit the pressure from said heat-sensitive element to said bellows to expand the same and thereby to cause said control switch to be moved to said off position.

4. A control mechanism as defined in claim 3 in which said chamber has a bottom at least partly forming a further diaphragm, and further comprising a safety switch independent of said control switch operably connected to said further diaphragm, said safety switch being actuable by the movement of said further diaphragm to switch off said heating element upon the occurrence of an excessive pressure in said steam chamber.

References Cited by the Examiner
UNITED STATES PATENTS 1,109,996 9/1914 Kuhlmann _____ 200—140
1,921,684 8/1933 Lum _____ 200—140

BERNARD A. GILHEANY, *Primary Examiner.*

L. A. WRIGHT, *Assistant Examiner.*